United States Patent Office 3,631,212
Patented Dec. 28, 1971

3,631,212
PREPARATION OF POLYARYLPOLYALKANES
Louis Schmerling, Riverside, Ill., assignor to Universal
Oil Products Company, Des Plaines, Ill.
No Drawing. Filed Apr. 20, 1970, Ser. No. 30,355
Int. Cl. C07c 15/12
U.S. Cl. 260—668 C     10 Claims

ABSTRACT OF THE DISCLOSURE

Polyarylpolyalkanes are prepared by polymerizing an arylalkane in the presence of a catalyst comprising a Friedel-Crafts metal halide and a higher valence halide of metal which possesses at least two valences.

---

This invention relates to a method for the preparation of polyarylpolyalkanes. More particularly, the invention is concerned with the process for preparing polyarylpolyalkanes, utilizing a catalyst which consists of a mixture of halides of two separate metals.

The products which are obtained by utilizing the process of the present invention will find a wide variety of uses in the chemical field. The aforesaid products which comprise polymeric compounds will be useful in the chemical industry as components of various finished polymeric compositions of matter, being useful as intermediates in the preparation of polyester resins which are useful as partitions, panels, awnings, automotive parts, plates, moldings, frames, trays, boxes, luggage, pipe joint sealers, adhesives, etc., the particular use being dependent upon the particular form of the finished resin. In addition, these compounds may also be useful as intermediates in the preparation of foams of the polyurethane type which will find industrial and commercial uses in airplane construction, bedding for mattresses, and upholstery, interlinings for overcoats and sleeping bags, sound-proof walls, insulation for walls and ceilings to prevent unwanted heat transfer, life preservers, cigarette and air filters, etc.

It is, therefore, the object of this invention to provide a process for preparing polyarylpolyalkanes.

The further object of this invention is to provide a process for preparing polyarylpolyalkanes utilizing certain catalytic compositions of matter to prepare the desired polymers.

In one aspect an embodiment of this invention is found in a process for the preparation of a polyarylpolyalkane which comprises treating an arylalkane with a catalyst comprising a Friedel-Crafts metal halide and a higher valence halide of a metal which possesses at least two valences at reaction conditions, and recovering the resultant polyarylpolyalkane.

A specific embodiment of this invention is found in a process for the preparation of a polyarylpolyalkane which comprises treating ethylbenzene with a catalyst comprising a zinc chloride-cupric chloride mixture at a temperature in the range of from about 0° to about 300° C. and a pressure in the range of from about atmospheric to about 100 atmospheres, and recovering the resultant poly(ethylbenzene).

Other objects and embodiments will be found in the following further detailed description of the present invention.

As hereinbefore set forth the present invention is concerned with a process for the preparation of polyarylpolyalkanes in which an arylalkane is polymerized in the presence of certain catalytic compositions of matter of the type hereinafter set forth in greater detail. By a poly(alkylbenzene), I mean a condensation product formed by self-alkylation of two or more molecules of primary or secondary alkylbenzenes (arylalkanes) to yield a polyarylpolyalkane which has the formula $$ArCR_2(ArCR_2)_nArCHR_2$$

in which Ar is an aromatic nucleus, R is independently selected from the group consisting of hydrogen or alkyl and $n$ is an integer from 0 to about 10.

The arylalkane which may be polymerized includes mono- and polyalkylbenzenes, mono- and polyalkylnaphthalenes as well as alkylated fused ring compounds. For purposes of this invention the term "arylalkane" as used in the present specification and appended claims will include straight or branched chain alkyl-substituted aromatic compounds, cycloalkyl-substituted aromatic compounds and fused saturated ring aromatic compounds, the only criterion being that at least one alkyl group of the arylalkane must have at least one hydrogen atom attached to the α-carbon atom of the side chain group. Thus, it is possible to utilize primary and secondary alkyl groups as well as cycloalkyl and saturated fused ring groups while it is not contemplated that tertiary alkyl groups will constitute an operable species. Some specific examples of these arylalkanes which may be used as one of the starting materials for the process of this invention will include toluene, ethylbenzene, n-propylbenzene, isopropylbenzene (cumene), n-butylbenzene, sec-butylbenzene, n-amylbenzene, as well as normal and secondary alkyl substituents up to about 20 carbon atoms in length, these compounds including the straight- and branched-chain hexyl, heptyl-, octyl-, nonyl, decyl-, undecyl-, dodecyl-, tridecyl-, tetradecyl-, pentadecyl-, hexadecyl-, heptadecyl-, octadecyl-, nonadecyl-, and eicosylbenzenes; cycloalkyl-substituted benzenes such as cyclopentylbenzene, cyclohexylbenzene, etc.; fused ring compounds such as indan, 1,2,3,4-tetrahydronaphthalene, etc.; o-xylene, m-xylene, p-xylene, m-ethyltoluene, o-ethyltoluene, p-ethyltoluene, m-propyltoluene, o-propyltoluene, p-propyltoluene, m-isopropyltoluene, o-isopropyltoluene, p-isopropyltoluene, etc., methylnaphthalene, ethylnaphthalene, n-propylnaphthalene, isopropylnaphthalene, n-butylnaphthalene, sec-butylnaphthalene, cyclopentylnaphthalene, cyclohexylnaphthalene, etc. It is to be understood that the aforementioned arylalkanes may be polymerized individually or copolymerized in groups of two or more. It is further to be understood that the aforementioned arylalkanes are only representative of the class of compounds which may be used, and that the present invention is not necessarily limited thereto.

The catalytic composition of matter which is utilized to effect the process of this invention will comprise a mixture of a Friedel-Crafts metal halide and a higher valence halide of a metal which possesses at least two valences and, in addition, has the further criteria of being a weak or totally inactive Friedel-Crafts catalyst when used by itself. Examples of active Friedel-Crafts metal halides which will constitute one part of the catalytic composition of matter will include aluminum chloride, zinc chloride, zirconium chloride, ferric chloride, boron trifluoride, etc., the preferred metal halides comprising aluminum chloride and zinc chloride. The preferred higher valence halide of a metal which possesses at least two valences is cupric chloride although other inactive metal halide compounds which possess two valences may also be used.

Suitable other metals which form at least two metal halides differing in valence include mercury, iron, tin, cobalt, molybdenum, manganese, and chromium. The various bromides and chlorides of the above metals including mercuric chloride, mercuric bromide, cupric bromide, ferric chloride, ferric bromide, stannic chloride, stannic bromide, cobaltic chloride, cobaltic bromide, molybdenum trichloride, molybdenum tetrachloride, molybdenum pentabromide, manganese trichloride, manganese tribromide, chromic chloride, chromic bromide, etc. are thus utilizable within the scope of this invention.

The two components of the catalytic amount of the active Friedel-Crafts metal halide and a stoichiometric amount of the higher valence halide of the metal which possesses at least two valences.

The reaction conditions under which the process of this invention is effected will include temperatures in the range from about 0° up to about 300° C. and pressures ranging from atmospheric up to about 100 atmospheres or more. Generally speaking, the reaction temperature will be dependent upon the particular catalytic composition of matter which is used. When utilizing a particularly active Friedel-Crafts metal halide catalyst such as aluminum chloride with the relatively or totally inactive (for Friedel-Crafts reactions) metal halide compound such as cupric chloride, the reaction will be effective at temperatures ranging from about 0° to about 100° C. and preferably in a range from about 20° to about 40° C. When utilizing a less active Friedel-Crafts metal halide such as zinc chloride along with the cupric chloride, relatively higher temperatures in the upper portion of the aforesaid temperature range will be used, said temperature being from about 150° to about 250° C. and preferably at 200° C. In addition, it is also contemplated within the scope of this invention that the reaction may be effected in the presence of an added amount of hydrogen chloride and an oxygen-containing gas such as air whereby the cupric chloride, after being reduced to cuprous chloride, may be regenerated back to cupric chloride for further use as a catalyst. When an elevated pressure over that which is effected by the presence of air is desired, said excess of pressure is provided for by the introduction of a substantially inert gas such as nitrogen into the reaction vessel.

The process of this invention may be effected in any suitable manner and may comprise a batch or continuous type operation. For example, when a batch type operation is used and the reaction is to be effected utilizing a particularly active Friedel-Crafts metal halide as one portion of the catalytic composition of matter, aluminum chloride being a specific example, said operation may be effected by utilizing a reaction apparatus such as a flask provided with stirring and temperature control means such as an ice bath whereby the temperature may be controlled below ambient temperature. The arylalkane is placed in the flask and the catalyst is added thereto in incremental portions during a predetermined residence period while continuously stirring the mixture. The aforesaid residence time may range from 0.5 up to about 10 hours or more in duration. In addition, if so desired, the reaction flask may also have charged thereto hydrogen chloride and air may be circulated into the stirred mixture so that the cupric chloride may be regenerated. Upon completion of the residence time the product will be recovered, separated from the catalyst and purified by conventional means including extraction, recrystallization, etc. It is also contemplated that the reaction or polymerization may be effected in the batch type operation utilizing elevated temperatures and pressures. When such a process is used, the arylalkane and the catalyst composition of the type hereinbefore set forth in greater detail are placed in an appropriate apparatus such as a rotating autoclave. The autoclave is sealed and brought to the desired operating pressure by introducing an inert gas such as nitrogen, oxygen-containing gas such as air, or a mixture thereof into the autoclave. Following this the autoclave is heated to the desired operating temperature and maintained thereat for a predetermined period of time. At the end of this time, heating is discontinued, the autoclave is allowed to return to room temperature and the excess pressure is discharged. The reaction mixture is recovered, separated from the catalyst and subjected to conventional means of separation, purification, and recovery whereby the desired polyarylpolyalkane is isolated from any unreacted starting material and/or undesired side reactions which may have occurred.

It is also contemplated within the scope of this invention that the reaction for the preparation of a polyarylpolyalkane may be effected in a continuous manner. One such method of effecting this type of operation is to continuously charge the arylalkane to a reaction vessel which is maintained to the desired operating conditions of temperature and pressure and which contains the catalyst composite. As hereinbefore set forth, the desired operating pressure may be attained by the introduction of nitrogen and/or an oxygen-containing gas into the reaction vessel. Upon completion of the desired residence time, the reactor effluent is continuously withdrawn and the desired polyarylpolyalkane is separated from any unreacted starting materials and/or side products, the polyarylpolyalkane being sent to storage while the unreacted material is recycled to form a portion of the feed stock. Due to the physical nature of the catalyst composite, it is possible to effect a continuous manner of operation by utilizing a fixed bed method wherein the catalyst is disposed as a fixed bed in the reactor and the aryalkane is passed through said reactor in either an upward or downward flow; by utilizing a moving bed type of operation in which the catalyst bed and the arylalkane pass through the reactor either concurrently or countercurrently to each other; or a slurry type operation in which the catalyst is carried into the reactor as a slurry in the arylalkane.

Examples of polyarylpolyalkanes which may be prepared accordingly to the process of this invention will include polytoluene, poly(ethylbenzene), poly(n-propylbenzene), polycumene, polyindan, poly(m-xylene), poly(m-ethyltoluene), poly(m - ethylnaphthalene), poly(ethylnaphthalene), poly(cyclopentylbenzene), poly(cyclohexylnaphthalene), etc. It is to be understood that the aforementioned polyarylpolyalkanes are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

A mixture consisting of 52 g. of ethylbenzene and a catalyst composite comprising a mixture of 33 g. of zinc chloride and 64 g. of cupric chloride was placed in a glass liner of a rotating autoclave. The liner was sealed into the autoclave and nitrogen pressed until an initial pressure of 30 atmospheres was reached. The autoclave was then heated to a temperature of 200° C. and maintained thereat for a period of four hours, the pressure during this period reaching a maximum of 76 atmospheres. At the end of the aforementioned four hours heating was discontinued and the autoclave allowed to return to room temperature, the final pressure at room temperature being 36 atmospheres (the increased pressure was largely due to the formation of hydrogen chloride during the reaction). The excess pressure was discharged, the autoclave was opened and the reaction mixture was recovered. The viscous liquid was analyzed by means of gas liquid chromatography and mass spectrometry found to consist of a mixture of compounds having the formula

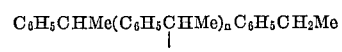

in which $n$ is an integer in the range of from 0 to about 10; the formula representing a large number of isomeric compounds.

EXAMPLE II

In this example a mixture of 57 g. of indan and a catalyst composite consisting of a mixture of 36 g. of zinc chloride and 66 g. of cupric chloride was placed in the glass liner of a rotating autoclave. The liner was sealed into the autoclave, nitrogen pressed in until an initial pressure of 30 atmospheres was reached, the autoclave was heated to a temperature of 300° C. and maintained thereat for a period of four hours. During the aforementioned time the pressure reached a maximum of 70 atmospheres and dropped to 38 atmospheres when the autoclave was allowed to return to room temperature. This excess pressure was discharged, the autoclave was opened and the reaction mixture was recovered. The product which consisted of a hard black solid was extracted with benzene followed by evaporation of the benzene yielding a viscous liquid consisting of polyindans.

EXAMPLE III

A mixture comprising 50 g. of toluene and a catalyst composite consisting of a mixture of 30 g. of zinc chloride and 60 g. of cupric chloride is placed in the glass liner of the rotating autoclave. The liner is sealed in the autoclave and after 0.3 mole of anhydrous hydrogen chloride is introduced the autoclave is pressured to 30 atmospheres by the introduction of 15 atmospheres of air and 15 atmospheres of nitrogen. The autoclave is heated to a temperature of 200° C. for a period of four hours during which time the pressure will rise to a maximum of about 70 atmospheres. At the end of the four hour period, heating is discontinued and the autoclave allowed to return to room temperature, the final pressure at room temperature being 30 atmospheres. The excess pressure is discharged, the autoclave is opened and the reaction mixture is recovered. After treatment in a manner similar to that set forth in the examples above the desired product comprising a mixture of polytoluenes is recovered.

EXAMPLE IV

A charge stock comprising 50 g. of m-xylene is placed in a reaction flask provided with magnetic stirring means and temperature control means, the latter consisting of an ice bath. A catalyst composite comprising a mixture of 32 g. of aluminum chloride and 60 g. of cupric chloride is added to the stirred charged stock in three incremental portions during a period of 1.5 hours, the temperature of the reaction being maintained at about 20° C. by the means of intermittent cooling with an ice bath. The resulting reaction mixture is stirred for an additional period of two hours after which the mixture is allowed to return to room temperature. The product is treated in a manner similar to that set forth in the above examples whereby the desired product comprising a mixture of poly-m-xylenes is recovered.

EXAMPLE V

In this example 50 g. of ethylnaphthalene is treated in a manner of that set forth in Example I above with a catalytic composite consisting of a mixture of 32 g. of zinc chloride and 63 g. of cupric chloride. After heating to a temperature of 200° C. over 30 atmospheres of additional nitrogen pressure for a period of four hours, said reaction being effected in a rotating autoclave, heating is discontinued, and excess pressure is discharged and the reaction mixture is recovered. Treatment of the said mixture in a manner of that set forth in Example II above will result in a recovery in a mixture of poly(ethylnaphthalenes).

I claim as my invention:

1. A process for the preparation of a polyarylpolyalkane which comprises treating an arylalkane with a catalyst comprising a Friedel-Crafts metal halide and a higher valence halide of a metal which possesses at least two valences at reaction conditions, and recovering the resultant polyarylpoyalkane.

2. The process as set forth in claim 1 in which said arylalkane possesses at least one hydrogen atom attached to an alpha-carbon atom of an alkyl group and a substitutable-hydrogen atom on the nucleus.

3. The process as set forth in claim 1 in which reaction conditions include a temperature in the range of from about 0° to about 300° C. and a pressure in the range of from about atmospheric to about 100 atmospheres.

4. The process as set forth in claim 1 in which said catalyst comprises an aluminum chloride-cupric chloride mixture.

5. The process as set forth in claim 1 in which said catalyst comprises a zinc chloride-cupric chloride mixture.

6. The process as set forth in claim 1 in which said arylalkane is ethylbenzene and said polyarylpolyalkane is a poly(ethylbenzene).

7. The process as set forth in claim 1 in which said arylalkane is indan and said polyarylpolyalkane is a polyindane.

8. The process as set forth in claim 1 in which said arylalkane is toluene and said polyarylpolyalkane is a polytoluene.

9. The process as set forth in claim 1 in which said arylalkane is my-xylene.

10. The process as set forth in claim 1 in which said arylalkane is ethylnaphthalene and said polyarylpolyalkane is a poly(ethylnaphthalene).

References Cited

UNITED STATES PATENTS

| 3,109,868 | 11/1963 | Fields et al. | 260—668 C |
| 3,428,700 | 2/1969 | Cyba | 260—668 C |

FOREIGN PATENTS

| 540,384 | 4/1957 | Canada | 260—668 C |

CURTIS R. DAVIS, Primary Examiner

U.S. Cl. X.R.

260—670